United States Patent
Osgood et al.

(10) Patent No.: US 11,053,809 B2
(45) Date of Patent: Jul. 6, 2021

(54) TURBINE ENGINE AIRFOIL

(71) Applicant: GENERAL ELECTRIC COMPANY, Schenectady, NY (US)

(72) Inventors: Daniel Endecott Osgood, Cincinnati, OH (US); David Alan Frey, West Chester, OH (US); Kirk D. Gallier, Cincinnati, OH (US); Steven Robert Brassfield, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 16/513,226

(22) Filed: Jul. 16, 2019

(65) Prior Publication Data
US 2021/0017869 A1   Jan. 21, 2021

(51) Int. Cl.
*F01D 9/06* (2006.01)
*F01D 25/14* (2006.01)

(52) U.S. Cl.
CPC ............ *F01D 9/065* (2013.01); *F01D 25/14* (2013.01); *F05D 2240/12* (2013.01)

(58) Field of Classification Search
CPC ....... F01D 9/065; F01D 25/14; F05D 2240/12
See application file for complete search history.

(56) References Cited

U.S. PATENT DOCUMENTS

| 7,520,723 | B2 | 4/2009 | Liang |
| 7,780,414 | B1* | 8/2010 | Liang ..................... F01D 5/187 416/97 R |
| 7,980,821 | B1 | 7/2011 | Liang |
| 8,025,482 | B1* | 9/2011 | Liang ..................... F01D 5/187 416/97 R |
| 8,087,892 | B1 | 1/2012 | Liang |
| 8,109,726 | B2 | 2/2012 | Liang |
| 9,732,617 | B2 | 8/2017 | Wang et al. |
| 2014/0369852 | A1* | 12/2014 | Zhang ..................... F01D 5/187 416/97 A |
| 2017/0129014 | A1 | 5/2017 | Bunker |
| 2018/0112533 | A1 | 4/2018 | Weber |
| 2018/0347372 | A1 | 12/2018 | Lacy et al. |

* cited by examiner

*Primary Examiner* — Jacob M Amick
*Assistant Examiner* — Charles J Brauch
(74) *Attorney, Agent, or Firm* — McGarry Bair PC (57) ABSTRACT

A component, such as for a turbine engine, can include an airfoil with an outer wall defining an exterior surface bounding an interior and defining a pressure side and a suction side extending between a leading edge and a trailing edge to define a chord-wise direction and extending between a root and a tip to define a span-wise direction. The component can also include at least one cooling passage within the interior.

20 Claims, 6 Drawing Sheets

TURBINE ENGINE AIRFOIL

TECHNICAL FIELD

This disclosure generally relates to turbine engines and more specifically relates to cooling of components of a turbine engine.

BACKGROUND

Turbine engines, and particularly gas or combustion turbine engines, are rotary engines that extract energy from a flow of pressurized combusted gases passing through the engine onto a multitude of rotating turbine blades.

Turbine engines are often designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is at a high temperature, it is cooler relative to the turbine air, and can be used to cool the turbine. It can be beneficial to cool components of the turbine engine, such as airfoils, in the high-temperature environment, where such cooling measures can reduce material wear on these components and provide for increased structural stability during engine operation.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION

In one aspect, the disclosure relates to an airfoil for a turbine engine, comprising an outer wall defining an exterior surface bounding an interior and defining a pressure side and a suction side extending between a leading edge and a trailing edge to define a chord-wise direction and extending between a root and a tip to define a span-wise direction, a first set of cooling holes comprising a first outlet on the pressure side adjacent the trailing edge, and a second set of cooling holes having at least a portion offset from the first set of cooling holes in the span-wise direction and comprising a second outlet located in the trailing edge.

In another aspect, the disclosure relates to a method for cooling an engine component having an outer wall bounding an interior and defining a pressure side and a suction side extending between a leading edge and a trailing edge to define a chord-wise direction and extending between a root and a tip to define a span-wise direction, the method comprising flowing a first portion of cooling fluid through a first set of cooling holes comprising a first outlet proximate the trailing edge along the pressure side, emitting the first portion of cooling fluid through the first outlet adjacent to and spaced from the trailing edge, forming a cooling fluid film along the pressure side proximate one of the root or the tip, flowing a second portion of cooling fluid through a second set of cooling holes comprising a second outlet located in the trailing edge, and emitting the second portion of cooling fluid through the second outlet to cool the trailing edge.

DETAILED DESCRIPTION

Aspects of the present disclosure are directed to a cooled component. For the purposes of description, the cooled component will be described as a cooled turbine engine component, such as a cooled airfoil. It will be understood that the disclosure may have general applicability for any engine component, including turbines and compressors and non-airfoil engine components, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

As used herein, "a set" can include any number of the respectively described elements, including only one element. Additionally, the terms "radial" or "radially" as used herein refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
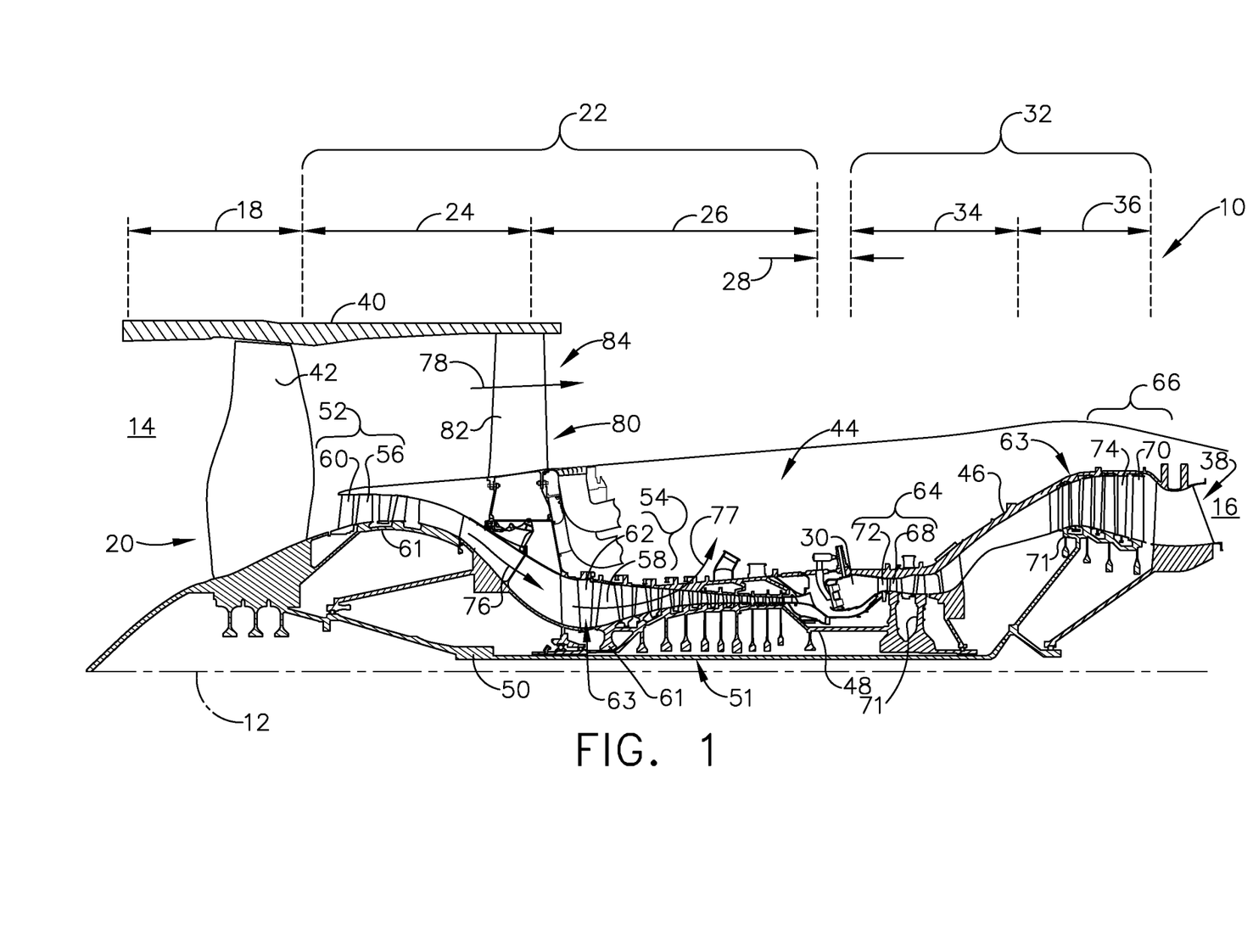
FIG. 1 is a schematic cross-sectional diagram of a turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
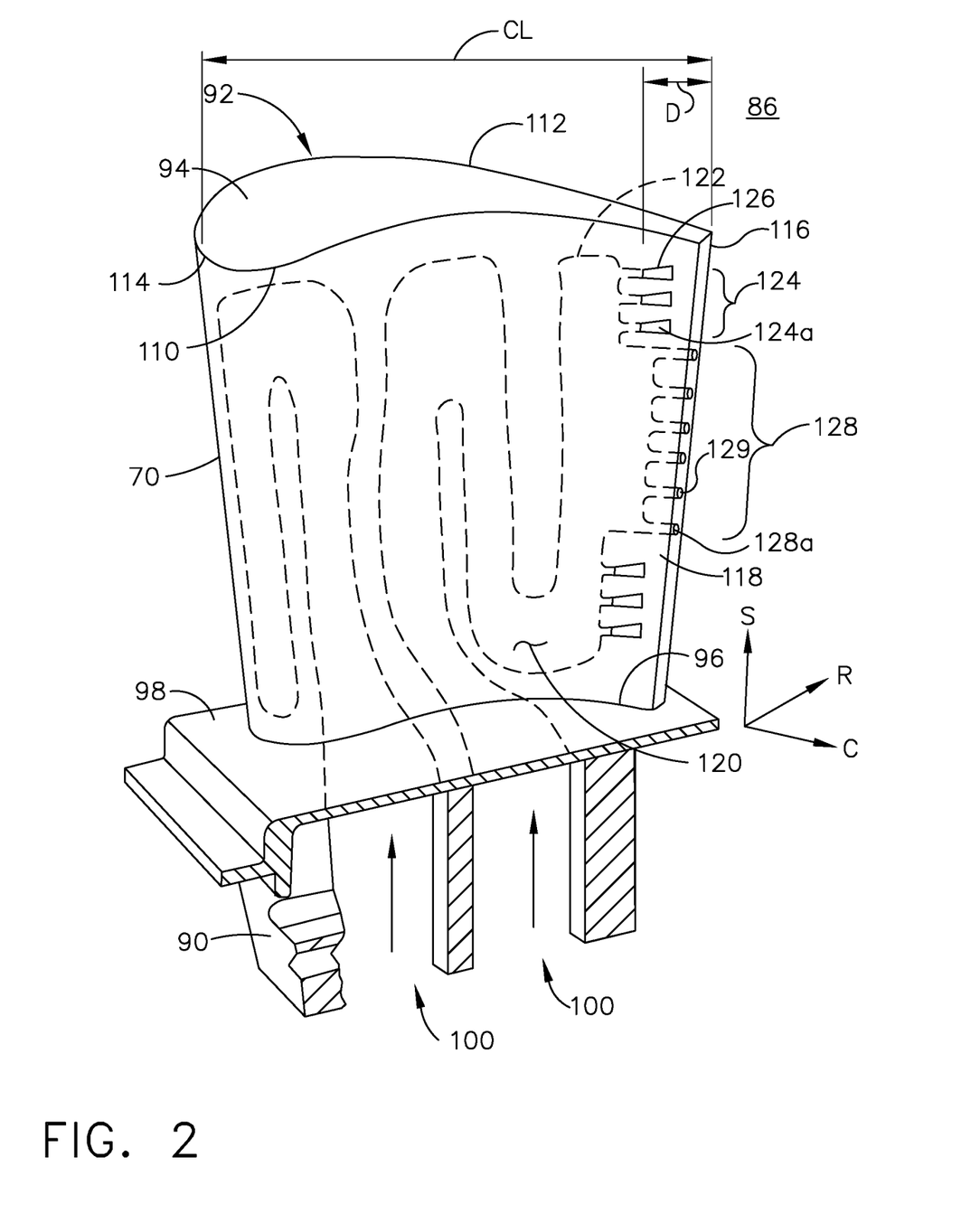
FIG. 2 is a perspective view of an airfoil for the gas turbine of FIG. 1 including internal cooling passages illustrated in dashed line.

FIG. 2 is a perspective view of a turbine blade assembly 86 with an engine component in particular a turbine blade 70 of the engine 10 from FIG. 1. Alternatively, the engine component can include a vane, a shroud, or a combustion liner in non-limiting examples, or any other engine component that can require or utilize cooling passages.

The turbine blade assembly 86 includes a dovetail 90 and an airfoil 92. The airfoil 92 extends between a tip 94 and a root 96 to define a span-wise direction S. The airfoil 92 mounts to the dovetail 90 on a platform 98 at the root 96. The platform 98 helps to radially contain the turbine engine mainstream air flow. The dovetail 90 can be configured to mount to the turbine rotor disk 71 on the engine 10. The dovetail 90 further includes at least one inlet passage 100, exemplarily shown as two inlet passages 100, each extending through the dovetail 90 to provide internal fluid communication with the airfoil 92. It should be appreciated that the dovetail 90 is shown in cross-section, such that the inlet passages 100 are housed within the body of the dovetail 90.

The airfoil 92 includes a concave-shaped pressure side 110 and a convex-shaped suction side 112 which are joined together to define an airfoil shape extending between a leading edge 114 and a trailing edge 116 to define a chord-wise direction C. The airfoil 92 has an interior 118 defined by an outer wall 120 defining an exterior surface and bounding the interior 118, and defining the pressure and suction sides 110, 112. The outer wall 120 defines the pressure side 110 and the suction side 112, and a cross-wise direction R can be defined therebetween. At least one cooling air supply conduit 122, referred to herein as cooling conduit 122, can be fluidly coupled with at least one of the inlet passages 100. A first set of cooling holes 124 can be located along the pressure side 110 proximate the trailing edge 116. The first set of cooling holes 124 can include at least one film cooling hole 124a with an outlet 126 located along outer wall 120 on the pressure side 110 and adjacent to the trailing edge 116. By adjacent, it is understood that the outlet 126 for the first set of cooling holes 124 is spaced from the trailing edge 116 a distance (D), 25% or less of a full chord length (CL) between the leading edge 114 and the trailing edge 116. It is also contemplated that the distance (D) is 15% or less the full chord length (CL). The distance (D) is measured from the trailing edge 116, or a point where the pressure side 110 meets the suction side 112 to a point on the outlet, a hood 138 of the at least one film cooling hole 124a, furthest from the trailing edge 116 in the chord-wise direction C. In an aspect of the disclosure herein, while illustrated as being located on the pressure side 110, it is contemplated that the set of cooling holes 124 as described herein can be located on the suction side 112, or on both the pressure side 110 and the suction side 112. To account for packaging, it is contemplated that the distance (D) is 15% or less the chord length (CL) for a set of cooling holes located on the pressure side 110 and 25% or less the chord length (CL) for a set of cooling holes located on the suction side 112 or vice versa as design and spacing allow for.

A second set of cooling holes 128 can include at least one trailing edge hole 128a having a second outlet 129 terminating along the trailing edge 116. The at least one cooling conduit 122 can be fluidly coupled to an exterior of the airfoil 92 via the first and second set of cooling holes 124, 128. It is contemplated that both the first and second set of cooling holes 124, 128 are fluidly coupled to the same at least one cooling conduit 122 or to separate cooling conduits 122.

The at least one cooling conduit 122 can be multiple cooling passages defining serpentine circuits throughout the interior 118. The serpentine circuits and first and second set of cooling holes 124, 128 can be formed using a variety of methods, including additive manufacturing, casting, electro-forming, or direct metal laser melting, in non-limiting examples. The airfoil 92 can be an additively manufactured component. As used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

Figure 3:
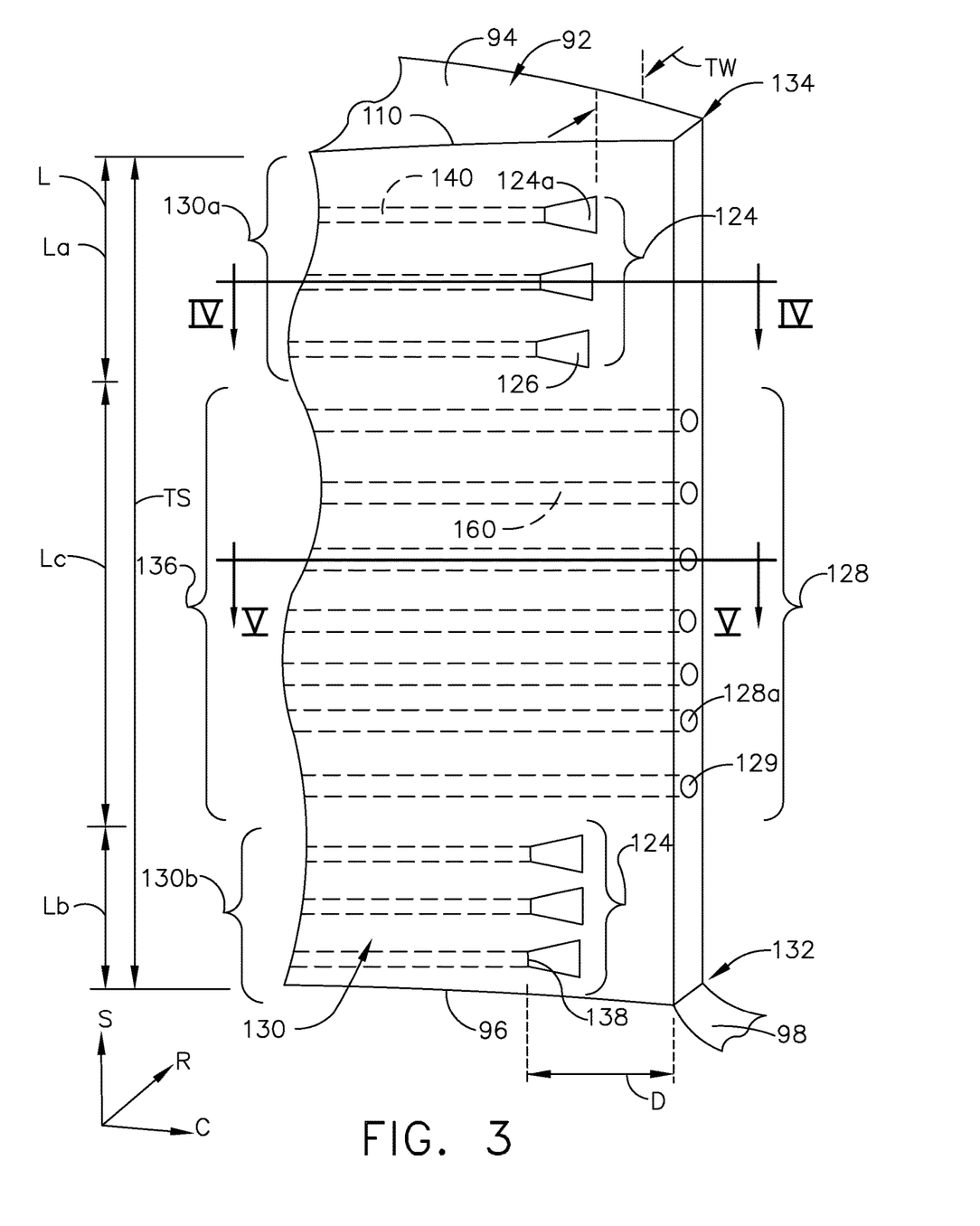
FIG. 3 is an enlarged schematic view of a trailing edge of the airfoil of FIG. 2 including a first set of cooling holes and a second set of cooling holes.

FIG. 3 is an enlarged schematic view of the airfoil 92 at the trailing edge 116. At least one outer region 130, illustrated as a tip outer region 130a and a root outer region 130b, can be defined by an area extending a dimension equal to a length (L) of up to 20% of a total span (TS) of the airfoil 92. The area of up to 20% of the total span (TS) is sufficient with respect to the operational goals for the engine component described herein, though any percentage is possible. Each of the tip outer region 130a and the root outer region 130b can extend lengths (La, Lb) up to 20% of the total span (TS) of the airfoil 92. In an aspect of the disclosure herein the tip outer region 130a and the root outer region 130b each extend a length (La, Lb) of between 5 and 10% of the total span (TS) of the airfoil 92.

It should be understood that in the illustrated example wherein the airfoil 92 is blade 70, the root 96 is adjacent the platform 98 coupled to the blade 70. In an alternate example wherein the airfoil 92 comprises a vane, the root 96 can be adjacent an inner band and the tip 94 can be adjacent an outer band (not shown) coupled to the vane. The airfoil 92 can be mounted to the inner/outer band or platform to form a fillet, by way of non-limiting example to the platform 98 forming a root fillet 132. Similarly a tip fillet 134 can be formed where the airfoil 92 is mounted to an outer band (not shown). These fillet regions can define regions of high stress.

A middle region 136 extends between the tip outer region 130a and the root outer region 130b along the trailing edge 116. The middle region 136 can extend a dimension equal to a length (Lc) of at least 60% of the total span (TS) of the airfoil 92. Again, with respect to the operational goals for the engine component described herein, 60% of the total span (TS) is sufficient for the middle region, though any percentage is possible. The first set of cooling holes 124 can be located within the at least one outer region 130, the tip outer region 130a, the root outer region 130b or both and the second set of cooling holes 128 can be located within the middle region 136.

The outlet 126 of the at least one film cooling hole 124a can be spaced from the trailing edge 116 in the chord-wise direction the distance (D). As previously described herein the distance (D) can be less than 25% the chord length (CL). The distance (D) can be large enough to develop an effective film along the outer wall 120 at the pressure side 110 proximate the trailing edge 116 and small enough to minimize the development of a turbulent flow of cooling fluid from the outlet 126. The distance (D) can be between 0 and 0.02 inches. When zero, the outlet 126 would open up at the trailing edge 116. In one aspect, the distance (D) can be balanced with a trailing edge width (TW).

Figure 4:
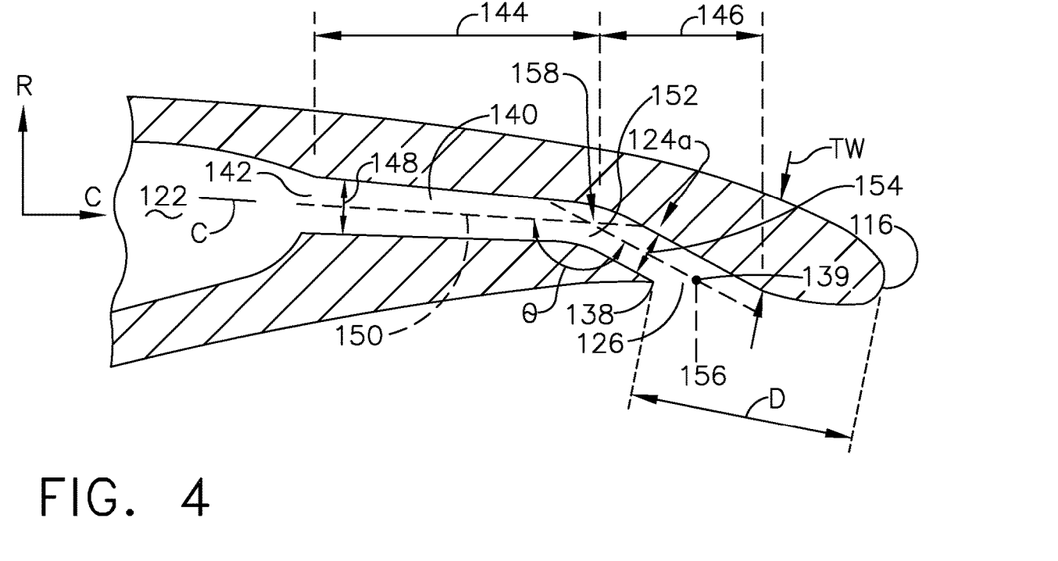
FIG. 4 is a cross-sectional view taken along line IV-IV of FIG. 3 of the first set of cooling holes.

Turning to FIG. 4, a cross-section of the airfoil 92 along line IV-IV of FIG. 3 is illustrated. The trailing edge width (TW) can more clearly be seen as a dimension of the airfoil 92 in cross-section at the trailing edge 116 measured along a line perpendicular to the distance (D). More specifically, the trailing edge width (TW) is a maximum width of a solid portion of the airfoil 92 at the trailing edge 116. Minimizing the distance (D) while maximizing the trailing edge width (TW) decreases stress concentrations within the tip outer region 130a and the root outer region 130b where the root and/or tip fillets 132, 134 are formed. During operation the trailing edge 116 is a very hot region of the airfoil 92, therefore minimizing the distance (D) so that cooling air can reach the trailing edge 116 while maintaining some trailing edge width (TW) that is downstream the outlet 124 of the hole enables a beneficial film effectiveness directly at the trailing edge 116.

FIG. 4 also illustrates the at least one film cooling hole 124a. It should be understood that the at least one film cooling hole 124a represents any one of the multiple film cooling holes 124a in the first set of cooling holes 124. The at least one film cooling hole 124a can define a through passage 140 extending between an inlet 142 fluidly coupled to the at least one cooling conduit 122 and the outlet 126. The through passage 140 includes a metering section 144 and a diffusing section 146.

The metering section 144 can have a circular cross section, though it could have any cross-sectional shape. The metering section 144 can define a cross-sectional area 148 that is the smallest, or minimum cross-sectional area of the through passage 140. The metering section 144 can extend along a metered centerline 150 from the inlet 142 to a metered outlet 152. It is further contemplated that the cross-sectional area 148 is maintained as a constant cross-sectional area 148 from the inlet 142 to the metered outlet 152. Maintaining a constant cross-sectional area 148 enables a controlled flow of a cooling fluid (C) upon entering the at least one film cooling hole 124a.

The metering section 144 can also have no length and is located at any portion of the through passage 140 where the cross-sectional area is the smallest. It is further contemplated that the metering section 144 can define the inlet 142 without extending into the through passage 140 at all. The through passage 140 can include multiple metering sections and is not limited to one as illustrated. The metering section 144 is for metering of the mass flow rate of the cooling fluid flow (C).

The diffusing section 146 is defined as a portion of the through passage 140 with a step-wise or continuously increasing cross-sectional area 154 terminating in the outlet 126 and having a diffused centerline 156. The diffusing section 146 can be in serial flow communication with the metering section 144 via the metered outlet 152. The metered centerline 150 can form an angle θ between 40 and 180 degrees with the diffused centerline 156 defining a turn 158. The angle θ can also be substantially orthogonal, or 90 degrees. It is alternatively contemplated that the diffusing section 146 extends along the entirety of the through passage 140 with little or no metering section 144.

Figure 5:
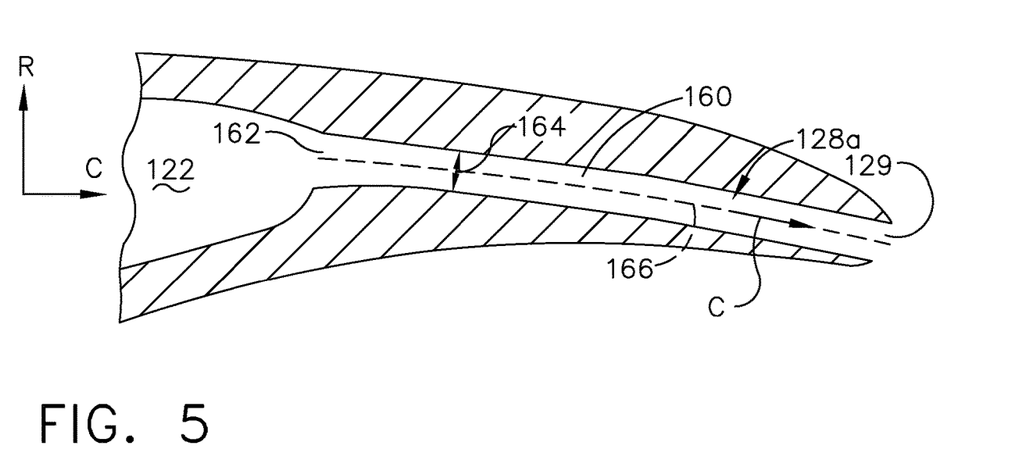
FIG. 5 is a cross-sectional view taken along line V-V of FIG. 3 of the second set of cooling holes.

FIG. 5 is a cross-section taken along V-V of FIG. 3 illustrating the at least one trailing edge hole 128a. It should be understood that the at least one trailing edge hole 128a represents any one of the multiple trailing edge holes 128a in the second set of cooling holes 128. The at least one trailing edge hole 128a can define a second through passage 160 extending between a second inlet 162 fluidly coupled to the at least one cooling conduit 122 and the second outlet 129. The second through passage 160 can have a circular cross section, though it could have any cross-sectional shape. The second through passage 160 can define a second cross-sectional area 164. The second through passage 160 can extend along a centerline 166 from the second inlet 162 to the second outlet 129. It is also possible that the second cross-sectional area 164 is maintained as a constant cross-sectional area 164 from the second inlet 162 to the second outlet 129. Maintaining a constant cross-sectional area 164 enables a controlled flow of a cooling fluid (C) upon entering the at least one trailing edge hole 128a. It should be understood that those skilled in the art can opt to include at least one flow enhancer in the first or second through passages 140, 160. By way of non-limiting example, a dimple, pin fin, or turbulator, or any other suitable flow enhancer can be included for increasing the heat exchange between the outer wall 120 and the cooling fluid (C).

Figure 6:
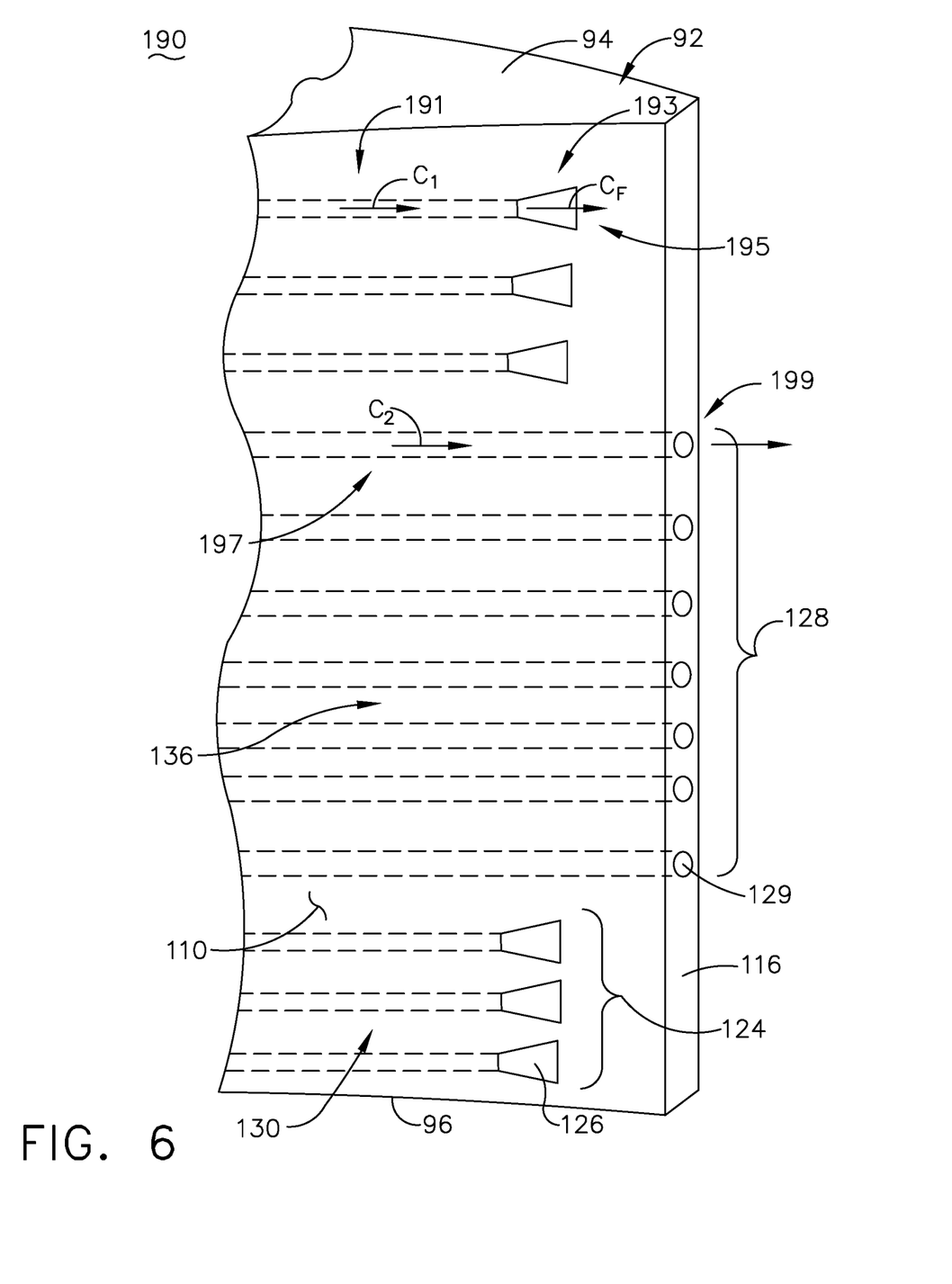
FIG. 6 is the same as FIG. 3 and illustrates a method for cooling the airfoil of FIG. 2.

A method 190 for cooling an engine component, by way of non-limiting example the airfoil 92 described herein, is illustrated in FIG. 6. FIG. 6 is the same as FIG. 3 with some numbers removed for clarity. The method 190 includes at 191 flowing a first portion of cooling fluid (C) through the first set of cooling holes 124 and at 193 emitting the first portion of cooling fluid (C) through the first outlet 126 along the pressure side 110 adjacent to and spaced from the trailing edge 116. At 195 forming a cooling fluid film (Cf) along the pressure side 110 proximate one of the root 96 or the tip 94, or as illustrated both the root 96 and the tip 94. At 197 flowing a second portion of cooling fluid (C2) through the second set of cooling holes 128 and at 199 emitting the second portion of cooling fluid (C2) through the second outlet 129 to cool the trailing edge 116.

The method can include emitting the first portion of cooling fluid (C1) in a first region, or the outer region 130 as described herein, of the engine component and emitting the second portion of cooling fluid (C2) in a second region, or the middle region 136 as described herein.

A cooling fluid film (Cf) on the trailing edge 116 can be advantageous over trailing edge ejection as occurs in the second set of cooling holes 128 because the first outlet 126, a film hole outlet, spreads the air out more than the second outlet 129, a trailing edge ejection outlet. In this manner less cooling fluid is required to cool more space near the root 96 and tip 94. Additionally balancing the diffused airflow exiting the first set of cooling holes 124 with less diffused airflow exiting the second set of cooling holes 128 enables the use of less holes within the first set of cooling holes 124 and concentrating more cooling air to the second set of cooling holes 128 where the airfoil is typically hotter.

Figure 7:
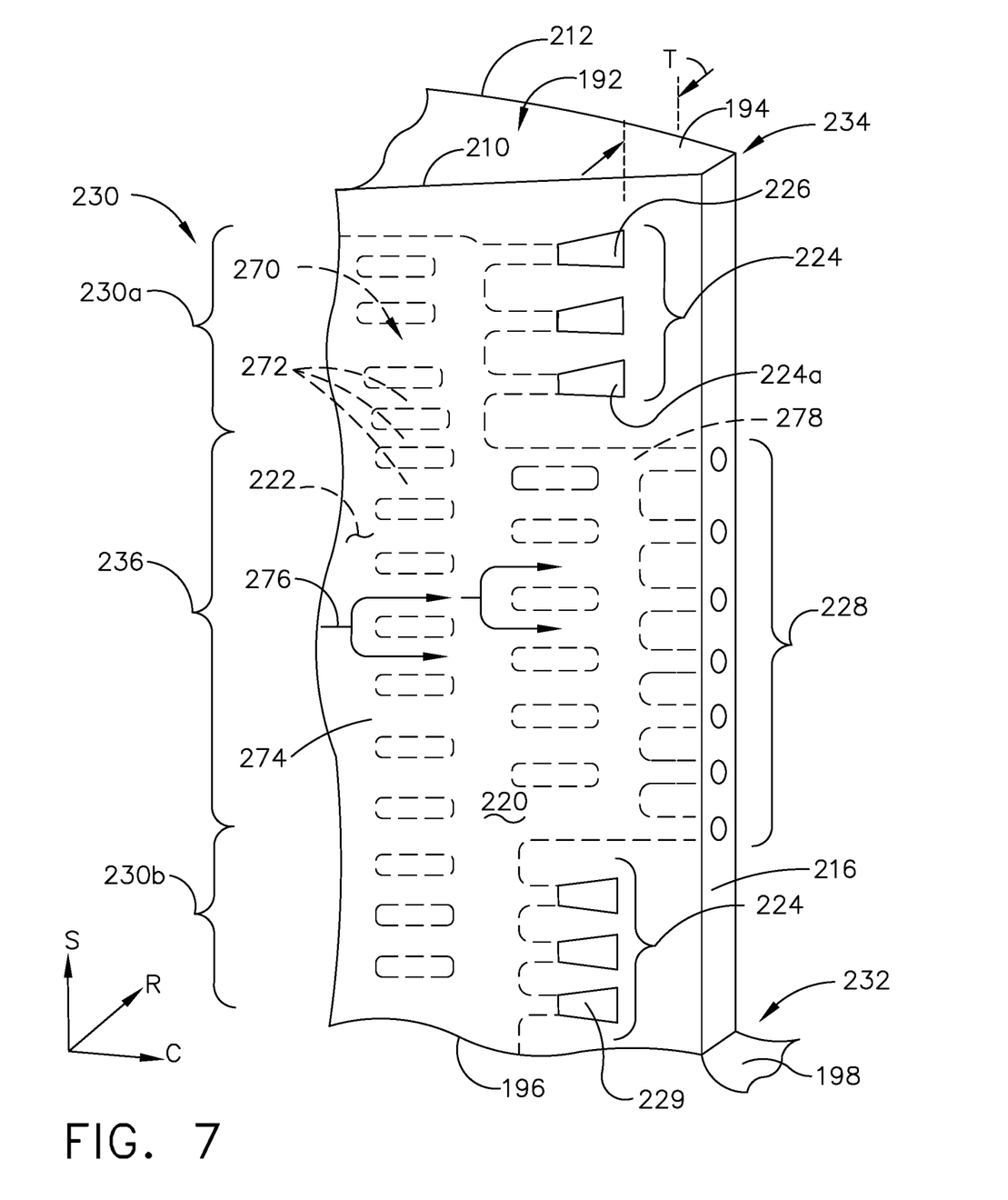
FIG. 7 is an enlarged schematic view of a trailing edge of the airfoil of FIG. 2 according to another aspect of the disclosure herein.

Referring now to FIG. 7, another first and second set of cooling holes 224, 228 is illustrated in an airfoil 192. The first and second set of cooling holes 224, 228 is similar to the first and second set of cooling holes 124, 128; therefore, like parts will be identified with like numerals increased by 100, with it being understood that the description of the like parts of the first and second set of cooling holes 124, 128 applies to the first and second set of cooling holes 224, 228, unless otherwise noted.

A plexus 270 can be formed within the airfoil 192 and include a plurality of cooling passages 272 fluidly coupled to at least one cooling cavity 222. It should be understood that although illustrated with "flat" passages and regions, the plexus 270 represents three-dimensional open spaces or voids within the airfoil 192. The span-wise and chord-wise directions S, C are illustrated for reference. It should be understood that the plexus 270 can be oriented in any suitable direction within the airfoil 192, including along any combination of the span-wise direction S, chord-wise direction C, or cross-wise direction R.

The plexus 270 of cooling passages 272 can include at least one inlet 274 wherein the cooling fluid (C) can be supplied to the plexus 270. The at least one inlet 274 is illustrated as a plurality of inlets 274 extending in the span-wise direction S. The plexus 270 can extend between the at least one inlet 274 and at least one of the, or both of, the outlets 226, 229. The outlets 226, 229 can be located at any or all of a leading edge 114 (FIG. 2), trailing edge 216, root 196, tip 194, or platform 198. The plexus 270 can be fluidly coupled to the first set of cooling holes 224, the second set of cooling holes 228, or to both sets of cooling holes 224, 228 as illustrated.

The at least one inlet 274 can include a slot, hole, or combination as desired. It is contemplated that the inlet 274 can receive cooling fluid from any desired location within the airfoil assembly 86 (FIG. 2), such as an interior passage of the platform 198, or the cooling conduit 222 within the airfoil 192 as illustrated. In addition, while the plexus 270 is illustrated proximate the trailing edge 216 of the airfoil 92, the plexus 270 can extend to any portion of the airfoil 92 including the leading edge 114 (FIG. 2), root 196, tip 194, or elsewhere along the pressure side 210 or suction side 212. Multiple plexuses can also be provided within the airfoil 92.

As is illustrated, the cooling passages 272 of the plexus 270 can furcate, including recursively furcating, at least twice in the downstream direction indicated by the arrow 276. For example, the recursively-furcated plexus 270 can define a fractal pattern. In addition, the cooling passages 272 can further include a non-furcated passage or non-furcated portion 278. In the illustrated example, the outlets 226, 229 can be fluidly coupled to the plexus 270. It should be understood that the outlets 226, 229 can include in-line diffusers, diffusing slots, film holes, ejection holes, channels, and the like, or combinations thereof.

The method 190 as described herein can further include flowing at least one of the first and second portions of cooling fluid (C1, C2) through the plexus 270 of fluidly interconnected cooling passages in fluid communication with at least one of the first or second set of cooling holes. The method can also include flowing both the first and second portions of cooling fluid (C1, C2) through the plexus 270, which is in fluid communication with both the first and second set of cooling holes 224, 228 as illustrated. The method 190 can further include splitting the cooling fluid (C) into at least a first and second portion of cooling fluid (C1, C2) by flowing the cooling fluid (C) through the furcated plexus 270.

Benefits associated with separated regions of cooling the trailing edge of an airfoil include optimizing the cooling locations for both cooling performance and mechanical durability. In particular using cooling holes located forward of the trailing edge and proximate the root and tip where high stresses are located improves durability. Leveraging or balancing trailing edge ejection, or the cooling holes along the trailing edge with trailing edge cooling film, or the cooling holes proximate the trailing edge on the pressure side, simultaneously improves durability over traditional cooling hole designs.

It should be understood that application of the disclosed design is not limited to turbine engines with fan and booster sections, but is applicable to turbojets and turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. An airfoil for a turbine engine, comprising: an outer wall defining an exterior surface bounding an interior and defining a pressure side and a suction side extending between a leading edge and a trailing edge to define a chord-wise direction and extending between a root and a tip to define a span-wise direction; a first set of cooling holes comprising a first outlet on the outer wall adjacent the trailing edge; and a second set of cooling holes having at least a portion offset from the first set of cooling holes in the span-wise direction and comprising a second outlet located in the trailing edge.

2. The airfoil of any preceding clause wherein the first set of cooling holes is located within at least one outer region extending a dimension of up to 20% of a total span of the airfoil in the span-wise direction from one of the root or the tip along the outer wall.

3. The airfoil of any preceding clause wherein the at least one outer region is two outer regions, a root outer region extending in the span-wise direction from the root and a tip outer region extending in the span-wise direction from the tip.

4. The airfoil of any preceding clause wherein the dimension for each of the root outer region and tip outer region extent is up to 20% of the total span of the airfoil.

5. The airfoil of any preceding clause wherein the second set of cooling holes are located within a middle region extending in the span-wise direction between the root outer region and the tip outer region.

6. The airfoil of any preceding clause wherein the middle region extends a dimension of at least 60% of the total span of the airfoil between the root outer region and the tip outer region.

7. The airfoil of any preceding clause wherein the first set of cooling holes is located proximate one of the root or tip in an outer region defined at least in part by a length of between 5 and 10% of a total span of the airfoil extending in the span-wise direction from one of the root or tip respectively.

8. The airfoil of any preceding clause wherein the second set of cooling holes are located within a middle region extending in the span-wise direction from where the first set of cooling holes ends.

9. The airfoil of any preceding clause wherein the middle region extends a dimension of at least 60% of the total span of the airfoil.

10. The airfoil of any preceding clause wherein the first outlet is adjacent the trailing edge by being spaced from the trailing edge a dimension equal to or less than 25% of a full chord length of the airfoil measured from the leading edge to the trailing edge.

11. The airfoil of any preceding clause further comprising at least one cooling conduit within the interior.

12. The airfoil of any preceding clause further comprising a plexus of fluidly interconnected cooling passages in fluid communication with the at least one cooling conduit and in fluid communication with at least one of the first or second set of cooling holes.

13. The airfoil of any preceding clause wherein the plexus is in fluid communication with both the first set and second set of cooling holes.

14. The airfoil of any preceding clause wherein the first set of cooling holes includes at least one outlet spaced from the trailing edge to define a trailing edge width measured from the suction side to a point of the at least one outlet closest to the trailing edge.

15. The airfoil of any preceding clause wherein the trailing edge width is at least 80% of a trailing edge width measured from the suction side to a midpoint of the at least one outlet.

16. A method for cooling an engine component having an outer wall bounding an interior and defining a pressure side and a suction side extending between a leading edge and a trailing edge to define a chord-wise direction and extending between a root and a tip to define a span-wise direction, the method comprising: flowing a first portion of cooling fluid through a first set of cooling holes comprising a first outlet proximate the trailing edge along the outer wall; emitting the first portion of cooling fluid through the first outlet adjacent to and spaced from the trailing edge; forming a cooling fluid film along the outer wall proximate one of the root or the tip; flowing a second portion of cooling fluid through a second set of cooling holes comprising a second outlet located in the trailing edge; and emitting the second portion of cooling fluid through the second outlet to cool the trailing edge.

17. The method of any preceding clause further comprising forming a cooling fluid film along the pressure side proximate the root and the tip.

18. The method of any of any preceding clause further comprising emitting the first portion of cooling fluid in a first region of the engine component and emitting the second portion of cooling fluid in a second region of the airfoil separate from the first region of the engine component.

19. The method of any of any preceding clause further comprising flowing at least one of the first and second portions of cooling fluid through a plexus of fluidly interconnected cooling passages in fluid communication with at least one of the first or second set of cooling holes.

20. The method of aspect any of any preceding clause further comprising splitting a cooling fluid into at least the first and second portions of cooling fluid by flowing the cooling fluid through a furcated plexus.

What is claimed is:

1. An airfoil for a turbine engine, comprising:
   an outer wall defining an exterior surface bounding an interior and defining a pressure side and a suction side extending between a leading edge and a trailing edge to define a chord-wise direction and extending between a root and a tip to define a span-wise direction with a total span dimension;
   at least one outer region defined by an area extending a dimension of up to 20% of the total span from at least one of the root or the tip along the outer wall, the at least one outer region free of cooling hole outlets along the trailing edge;
   a middle region defined by an area radially spaced from at least one of the root or the tip by the dimension of the at least one outer region;
   a first set of cooling holes located in the at least one outer region comprising a first outlet on the outer wall, the first outlet spaced in the chord-wise direction from the trailing edge; and
   a second set of cooling holes located in the middle region, having at least a portion offset from the first set of cooling holes in the span-wise direction and comprising a second outlet located in the trailing edge.

2. The airfoil of claim 1 wherein the at least one outer region is two outer regions, a root outer region extending in the span-wise direction from the root and a tip outer region extending in the span-wise direction from the tip and wherein the dimension for each of the root outer region and tip outer region extent is up to 20% of the total span of the airfoil.

3. The airfoil of claim 1 wherein the middle region extends a dimension of at least 60% of the total span of the airfoil between the root outer region and the tip outer region.

4. The airfoil of claim 1 wherein the at least one outer region is defined at least in part by a length of between 5 and 10% of the total span of the airfoil extending in the span-wise direction from one of the root or tip respectively.

5. The airfoil of claim 4 wherein the second set of cooling holes are located within the middle region extending in the span-wise direction from where the first set of cooling holes ends.

6. The airfoil of claim 5 wherein the middle region extends a dimension of at least 60% of the total span of the airfoil.

7. The airfoil of claim 1 wherein the first outlet is spaced from the trailing edge a dimension equal to or less than 25% of a full chord length of the airfoil measured from the leading edge to the trailing edge.

8. The airfoil of claim 1 further comprising at least one cooling conduit within the interior.

9. The airfoil of claim 8 further comprising a plexus of fluidly interconnected cooling passages in fluid communication with the at least one cooling conduit and in fluid communication with at least one of the first or second set of cooling holes.

10. The airfoil of claim 9 wherein the plexus is in fluid communication with both the first set and second set of cooling holes.

11. The airfoil of claim 1 wherein the first set of cooling holes includes at least one outlet spaced from the trailing edge to define a trailing edge width measured from the suction side to a point of the at least one outlet closest to the trailing edge.

12. The airfoil of claim 11 wherein the trailing edge width is at least 80% of a trailing edge width measured from the suction side to a midpoint of the at least one outlet.

13. A method for cooling an engine component having an outer wall bounding an interior and defining a pressure side and a suction side extending between a leading edge and a trailing edge to define a chord-wise direction and extending between a root and a tip to define a span-wise direction with a total span dimension, the method comprising:
   flowing a first portion of cooling fluid through a first set of cooling holes comprising a first outlet spaced in the chord-wise direction from the trailing edge along the outer wall;
   emitting the first portion of cooling fluid through the first outlet spaced from the trailing edge in a root region of the engine component, the root region defined by an area extending a dimension of up to 20% of the total span from the root;
   forming a cooling fluid film along the outer wall proximate the root;
   flowing a second portion of cooling fluid through a second set of cooling holes comprising a second outlet located in the trailing edge; and
   emitting the second portion of cooling fluid through the second outlet in a middle region of the engine component separate from the root region of the engine component to cool the trailing edge.

14. The method of claim 13 further comprising emitting the first portion of cooling fluid through the first set of cooling holes located in a tip region of the engine component, the tip region defined by an area extending a dimension of up to 20% of the total span from the tip and forming a cooling fluid film along the pressure side proximate the root and the tip.

15. The method of claim 13 further comprising flowing at least one of the first and second portions of cooling fluid through a plexus of fluidly interconnected cooling passages in fluid communication with at least one of the first or second set of cooling holes.

16. The method of claim 13 further comprising splitting a cooling fluid into at least the first and second portions of cooling fluid by flowing the cooling fluid through a furcated plexus.

17. The method of claim 13 further comprising turning the first portion of cooling fluid from a first direction to a second direction toward the pressure side.

18. An airfoil for a turbine engine, comprising:
- an outer wall defining an exterior surface bounding an interior and defining a pressure side and a suction side extending between a leading edge and a trailing edge to define a chord-wise direction and extending between a root and a tip to define a span-wise direction with a total span dimension;
- a root outer region defined by an area extending a dimension of up to 20% the total span dimension from the root along the outer wall;
- a first set of cooling holes comprising a first outlet on the outer wall spaced in the chord-wise direction from the trailing edge, at least a portion of the first set of cooling holes located in the root outer region;
- a middle region defined by an area between the root and the tip and radially spaced from the root by the dimension of the root outer region; and
- a second set of cooling holes, separate from the first set of cooling holes, comprising a second outlet located in the trailing edge, the second set of cooling holes located in the middle region.

19. The airfoil of claim 18 further comprising a tip outer region defined by an area extending a dimension of up to 20% the total span dimension from the tip wherein at least a portion of the first set of cooling holes is located in the tip outer region.

20. The airfoil of claim 19 wherein the trailing edge within at least one of the root outer region or tip outer region is free of cooling hole outlets along the trailing edge.

* * * * *

UNITED STATES PATENT AND TRADEMARK OFFICE
CERTIFICATE OF CORRECTION

| | |
|---|---|
| PATENT NO. | : 11,053,809 B2 |
| APPLICATION NO. | : 16/513226 |
| DATED | : July 6, 2021 |
| INVENTOR(S) | : Osgood et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 24 days.

Signed and Sealed this
Seventh Day of February, 2023

Katherine Kelly Vidal
*Director of the United States Patent and Trademark Office*